United States Patent

Van Laethem

[15] 3,650,719
[45] Mar. 21, 1972

[54] CHEMICAL AND THERMAL TEMPERING OF VITREOUS MATERIALS

[72] Inventor: Robert Van Laethem, Les Morlaires, Belgium

[73] Assignee: Glaverbel S. A., Watermael, Boitsfort, Belgium

[22] Filed: Apr. 26, 1968

[21] Appl. No.: 724,336

[30] Foreign Application Priority Data

Apr. 27, 1967 Luxembourg............................53,546
Feb. 8, 1968 Great Britain........................6,390/68

[52] U.S. Cl..........................................65/30, 65/60, 65/114, 117/124
[51] Int. Cl.........................................................C03c 17/00

[58] Field of Search.........................65/30, 60, 114; 117/124

[56] References Cited

UNITED STATES PATENTS

| 3,287,200 | 11/1966 | Hess et al. | 65/30 X |
| 3,287,201 | 11/1966 | Chisholm et al. | 65/30 X |
| 3,396,075 | 8/1968 | Morris | 65/30 X |
| 3,498,775 | 3/1970 | Simmons | 65/33 |
| 3,505,049 | 4/1970 | Plumat | 65/30 |

Primary Examiner—S. Leon Bashore
Assistant Examiner—J. B. Hardaway
Attorney—Spencer & Kaye

[57] ABSTRACT

A process for treating vitreous materials to temper them which includes first chemically and then thermally tempering such materials.

11 Claims, 2 Drawing Figures

CHEMICAL AND THERMAL TEMPERING OF VITREOUS MATERIALS

BACKGROUND OF THE INVENTION

The present invention relates to processes and apparatus for tempering vitreous and vitrocrystalline material.

It is known that glass can be toughened by a thermal or chemical tempering treatment. Thermal tempering involves heating and subsequent rapid cooling of the glass to set up compressive stresses in exterior layers thereof as a result of the more rapid cooling of such layers. In chemical tempering, compressive stresses are set up in exterior layers of the glass by causing atoms, molecules, or ions from a contacting medium to enter such layers under suitable conditions. Usually, chemical tempering involves the replacement of ions in the glass by entering ions of different size by an ion exchange mechanism. It is possible for example to set up compressive stresses by substituting for ions in exterior layers of the glass smaller ions which impart a lower coefficient of thermal expansion to such exterior layers while the surfaces of the glass are at a temperature above the strain point (corresponding to $10^{14.6}$ poises). Alternatively, such stresses can be set up by substituting for ions in exterior layers of the glass larger ions while the surfaces of the glass are at a temperature below the annealing point.

Proposals have been made to improve the mechanical properties of sheets of glass by subjecting them to a thermal tempering treatment and subsequently reheating them and subjecting them to a chemical tempering treatment.

SUMMARY OF THE INVENTION

With this in mind it is a main object of the present invention to provide a tempering treatment of vitreous materials which is more advantageous than prior processes.

Another object is to provide a combined chemical and thermal tempering process.

A further object is to provide such a combined process which is economical.

The invention provides not only a process but apparatus for performing it and an article treated thereby.

These objects and others ancillary thereto are accomplished in accordance with preferred embodiments of the invention wherein a vitreous or vitrocrystalline material is heated and then sufficiently rapidly cooled to set up compressive stresses in exterior layers thereof as a result of the more rapid cooling which occurs at such layers. While the material is at an elevated temperature in such thermal tempering procedure, ion exchange occurs between such material and a contacting medium and causes compressive stresses additional to those caused by the cooling differential to be set up in external layers of said material when cooling takes place.

This process can be performed more economically than a process requiring the material to be reheated after a first tempering treatment. In addition, a smoother compressive stress gradient can be obtained. The process also makes it possible to achieve stress gradients shallower than those obtainable solely by chemical tempering, and surface stresses of greater magnitude than can be attained solely by thermal tempering.

GENERAL DESCRIPTION OF THE INVENTION

The invention can be applied with particular advantage for strengthening glasses of ordinary composition, i.e., glasses formed from easily available inexpensive constituents, e.g., silica, soda, lime and feldspar.

The diffusion of ions into the vitreous or vitrocrystalline material can take place from a contacting gaseous, solid, or liquid medium. It is preferable to coat the material with a layer of a medium composed so that ion exchange leading to tempering of the material will take place between this medium and the vitreous or vitrocrystalline material at a suitably elevated temperature. The coating can be formed by dipping the material in a bath of molten medium. The material can be preheated before being coated with the medium, if so desired.

Two types of processes according to the invention and in which chemical tempering occurs as a result of ion exchange between the material and surface coatings thereon will now be outlined.

In one type of process a sheet of soda-lime glass is coated with a film of fused lithium salt, the coated sheet is heated to a temperature above the strain point of the glass to allow lithium ions to diffuse into the glass and to replace sodium ions, and the surface of the sheet is rapidly cooled to a temperature below the strain point so that internal stress relaxation can not occur, the diffusion preferably being terminated before the cooling is carried out so that the last lithium ions diffusing into the glass do not create undesirable permanent stresses. As a result, exterior layers of the sheet are placed in a state of compression. The stresses are in part attributable to the cooling of the sheet from a temperature above the strain point, and the depth to which the compressive stresses extend into the glass is as great as would be achieved solely by a thermal tempering treatment. The magnitude of the compressive stresses, however, notably at the immediate surface layers, is higher than would result from the thermal treatment alone. The substitution of lithium ions for sodium ions in the external layers of the glass reduces the coefficient of thermal expansion of these glass layers and the consequent tempering effects are superimposed on those attributable to the rapid cooling from above the strain point.

In a second type of process a sheet of soda-lime glass is coated with a film of fused potassium salt and the coated sheet is heated by thermal radiation comprising a large proportion of rays which penetrate to the interior layers of the glass sheet while the coated sheet is in contact with a heated gaseous medium. The thermal radiation and the temperature of the gaseous medium are controlled so that the internal layers of the glass are raised to a temperature above the strain point of the glass, e.g., above the annealing point or even above the softening point, but the temperature of the sheet at and adjacent to its surfaces, while rising sufficiently for potassium ions to diffuse from the coating film into the glass to replace smaller sodium ions, is kept below the annealing point. This radiation heating may take place near the end of chemical tempering so that the heat applied for thermal tempering will be used more efficiently. The sheet surfaces are subsequently rapidly cooled. As in the first type of process, the pattern and magnitude of the compressive stresses in the glass sheet show that thermal and chemical tempering effects are superimposed.

The foregoing description of two types of processes according to the invention has to do with soda-lime glass and with chemical tempering by exchange of sodium ions with lithium or potassium ions, but the same general procedure is applicable when treating other glasses or vitrocrystalline materials and when causing other ions to diffuse into the material to supplement the effects of the thermal tempering treatment.

For the second type of process above described, a radiant heat source or sources is or are required. Electrical resistance heaters or surfaces heated to incandescence by combustion of a gas can be used. The spectral composition of the rays emitted by such source or sources must be related to the composition of the vitreous or vitrocrystalline material being treated so that adequate radiation absorption by the interior layers of the material occurs. When treating a soda-lime glass, the heating of the interior layers of the glass can be achieved by irradiating the glass with infrared radiation comprising a substantial proportion of waves of wavelengths below 2.8 microns, let say 30 percent. The coating providing ions which are to diffuse into the glass must be sufficiently transparent to rays which can penetrate to the interior layers of glass. In other words, the coating must have substantial transparency to rays of wavelengths up to 2.7 microns, and preferably to rays of wavelengths up to 5 microns.

It is also possible for ions to diffuse directly into the glass from a contacting ionized gaseous medium. In any event, radiant heating elements rapidly heat the internal layers of a sheet of drawn soda-lime glass when the elements are at a temperature of 1,200° C. or higher. The radiant heat source or sources used for irradiating the vitreous or vitrocrystalline material may be placed in a treatment chamber through which gaseous medium is circulated for maintaining the surfaces of the material at an appropriate temperature, so that such radiant heat source or sources also "heat" the gaseous medium while the latter remains at a temperature which is lower than that to which the interior of the glass is heated.

The invention includes apparatus for use in tempering a sheet or other article of vitreous or vitrocrystalline material which includes means for contacting surfaces of the article with a medium from which ions can diffuse into the material, means for heating an article so coated so as to raise at least the interior layers of the material above the strain point thereof, and means for rapidly cooling the surfaces of the article.

The means for contacting surfaces of an article with a medium from which ions can diffuse into the material may comprise at least one container for holding a bath of liquid medium.

Preferred forms of apparatus comprise a treatment chamber into which an article to be tempered can be placed, means for irradiating an article while in the chamber so as to cause heating of such article due to radiation absorption, and means for circulating a gaseous medium through the chamber for maintaining surfaces of the article at a lower temperature than internal regions thereof during irradiation. There may be an article conveyor for conveying articles to be treated in succession through the treatment chamber.

DESCRIPTION OF THE PREFERRED EMBODIMENTS

Figure 1:
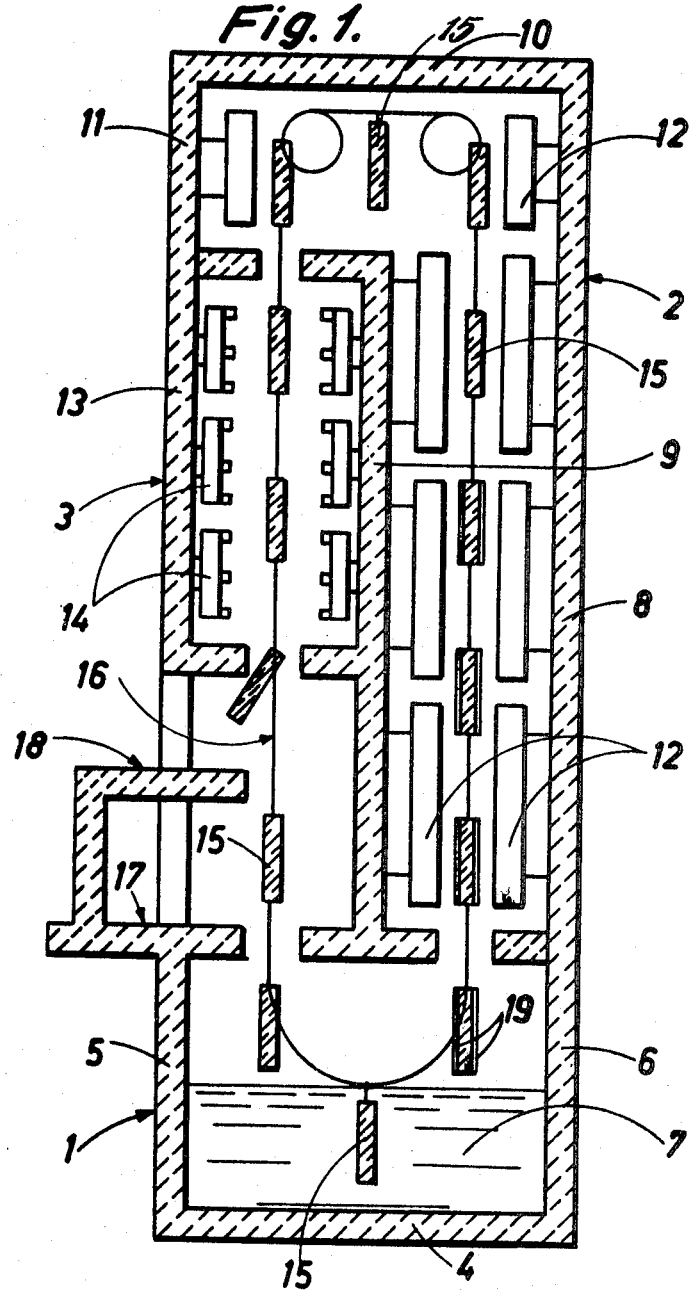
FIG. 1 is a vertical sectional view through one embodiment of apparatus of the present invention.

The apparatus shown in FIG. 1 comprises a tank 1, an oven 2, and a cooling compartment 3 forming parts of a common structure. The tank formed by bottom 4, side walls 5 and 6 and two other side walls, contains a molten salt 7. The oven 2 has an inverted L shape and is defined in part by a lateral wall 8, which is an upward extension of the wall 6 of the tank 1, an intermediate wall 9, a roof 10, and a wall 11. The oven is equipped with heating means 12, for example gas-heated radiant heating elements, distributed over internal surfaces of the oven. The cooling compartment 3 is defined in part by the intermediate wall 9 and a lateral wall 13 integral with the walls 11 and 5. The cooling compartment is equipped with coolers 14 distributed over internal surfaces of the compartment. These coolers are cooling air ducts with nozzles for discharging jets of cold compressed air.

Articles 15 to be treated are attached at the station 17 to an endless conveyor 16 which follows a cyclic course through the tank, the oven, and the cooling compartment, and removed from the conveyor at the delivery station 18. Communication between the three parts of the structure is restricted by internal horizontal walls. If required, gates (not shown) can be provided for closing communication between the three parts of the structure while the conveyor 16 is stationary.

Figure 2:
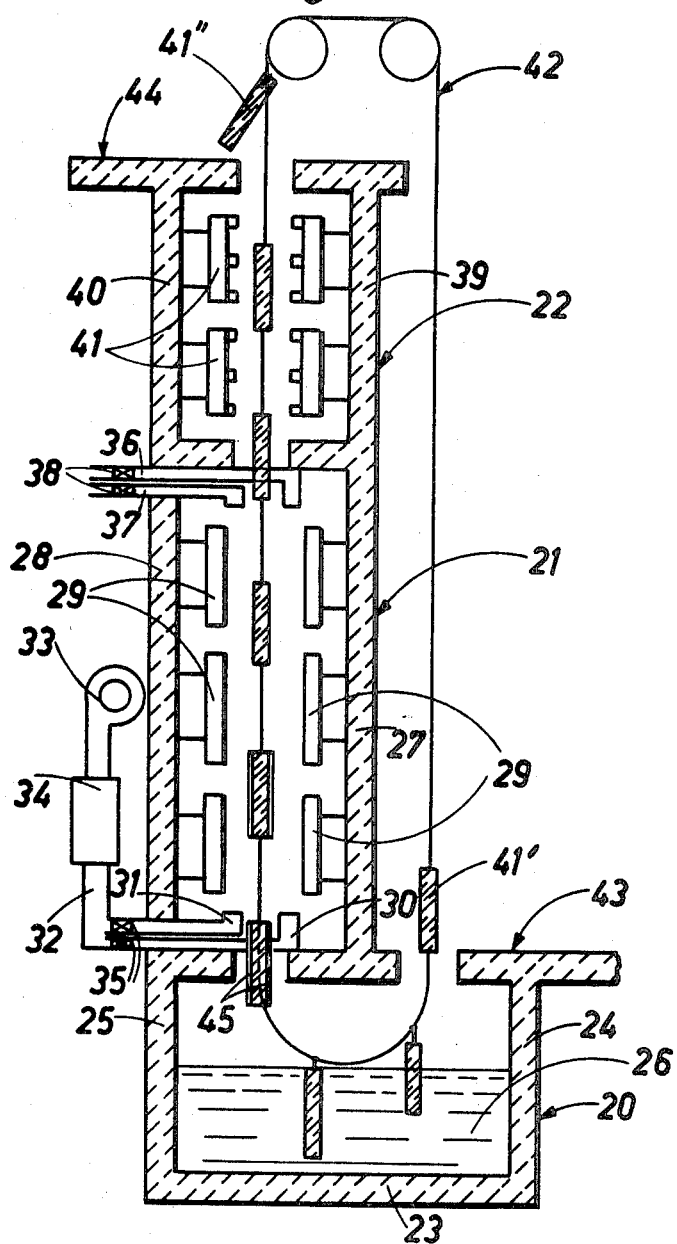
FIG. 2 is a vertical sectional view through another embodiment thereof.

The apparatus shown in FIG. 2 comprises a tank 20, an oven 21, and a cooling compartment 22 forming parts of a common structure. The tank 20, defined by bottom 23, side walls 24 and 25 and two other side walls, contains a bath 26 of molten salt. The oven is defined in part by side walls 27 and 28 and is equipped with electrical resistance heaters 29 distributed over the internal surfaces of such walls. At the bottom of the oven there are two pipes 30,31 through which hot air is blown by a blower 33 via a duct 32 and a heating device 34. The pipes 30,31 have their discharge orifices opening upwardly in the oven, on opposite sides of a central plane perpendicular to the plane of the drawing. Valves 35 are provided to permit regulation of the hot air supply. Hot air supplied to the oven is withdrawn through two pipes 36,37 fitted with control valves 38.

The cooling compartment 22 is defined in part by side walls 39,40 and is equipped with coolers 41 similar to the coolers 14 in the apparatus shown in FIG. 1. Articles 41' to be treated are attached at the station 43 to an endless conveyor 42 which conveys the articles through the tank, the oven, and the cooling compartment, and the treated articles 41'' are removed from the conveyor at a delivery station 44. Communication between the tank, oven, and cooling compartment is restricted by internal horizontal walls. As in the apparatus according to FIG. 1, gates (not shown) can be provided for closing communication between the three parts of the structure while the conveyor is stationary.

Certain processes according to the invention will now be described by way of examples:

EXAMPLE 1

Sheets of glass were chemically tempered in apparatus as shown in FIG. 1. The tank 1 contained a bath of lithium nitrate maintained at a temperature of 250° C. The speed of the article conveyor was regulated so that each sheet, by its passage through the bath, became coated with a film of the lithium salt of uniform thickness on each of its faces. Inside the oven the glass sheets were brought to a temperature approximately 50° C. above the strain point of the glass to permit relaxation of internal stresses. During the immersion and subsequent heating of each sheet, lithium ions entered the surface regions of the sheet in exchange for sodium ions and these regions contained a high concentration of lithium ions by the time the sheet reached the gateway between the oven and the cooling compartment. In the cooling compartment the sheets were cooled sufficiently rapidly to cause compressive stresses to be set up in the external layers of the glass. In the outermost of the layers under compression the magnitude of the compressive stresses was found to be in part attributable to the introduction of lithium ions in exchange for sodium ions which reduced the coefficient of expansion of the surface layers of the glass. The cooling rate of the sheet was of the order of 50° C./sec. at the beginning of the cooling process.

EXAMPLE 2

Sheets of soda-lime glass were chemically tempered in apparatus as shown in FIG. 2. The tank contained a bath of potassium nitrate maintained at a temperature of 380° C. The speed of the article conveyor was regulated so that each sheet, by its passage through the bath, became coated with a film of the potassium salt of uniform thickness on each of its faces. The electrical resistance heaters 29 were brought to a temperature of the order of 1,200° C. at which a large proportion of the heat radiation was of a wavelength in the range of about 1.5 to 2 microns. A considerable proportion of the heat rays penetrated to the internal layers of the glass and sufficient radiation was absorbed to raise the internal layers of the glass to a temperature above the strain point of the glass. At the same time "hot" air was continuously blown into the oven at a temperature such as to keep the external layers of the glass below the annealing point but sufficiently high for potassium ions in the coating films to diffuse into the surface layers of the glass in exchange for sodium ions. By the time each glass sheet reached the gateway between the oven and cooling compartment the surface layers of the sheet contained a high concentration of potassium ions. In the cooling compartment the sheets were cooled sufficiently rapidly to cause compressive stresses to be set up in external layers of the glass. It was found that in the outermost of the external layers under compression the magnitude of the compressive stresses was in part attributable to the substitution of sodium ions in the glass by larger potassium ions. The cooling rate of the sheet was of the order of 30° C./sec.

EXAMPLE 3

A sheet of soda-lime glass was immersed in a horizontal position in a bath of molten potassium nitrate maintained at 380° C. under thermostatic control. The upper surface of the glass sheet was one centimeter below the surface of the bath. While so immersed, the glass sheet was irradiated by heat radiation from radiant heating elements located above the bath and having a surface temperature of approximately 1,000° C. The sheet was thus irradiated for a period of 10 minutes and the sheet was then inverted and subjected to the same treatment for a further 10 minutes. The glass sheet was withdrawn from the bath and cooled to ordinary temperature. It was found that compressive stresses had been set up in external layers of the glass, due in part to the replacement of sodium ions in such external glass layers by larger potassium ions. The cooling of the glass sheet was effectuated by means of air jets. The cooling rate was of the same order as in the previous example.

EXAMPLE 4

A sheet of soda-lime glass was exposed to vapors of lithium nitrate at 620° C. while irradiated with heat radiation from an electrical heating element with a surface temperature of 1,400° C. A substantial proportion of the rays penetrated to the inner layers of glass and raised the temperature of such layers a little above the softening point. The sheet was subsequently cooled to cause compressive stresses to be set up in the external layers of glass. It was found that at the outermost layers the compressive stresses were in part attributable to the substitution for sodium ions in the glass of smaller lithium ions.

When in this application reference is made to "rapidly cooling" one must understand a rate of cooling which is able to confer a thermal temper to the glass, as is well known in the art. Such cooling rates have usually a value which is of the order of 10° C./sec. and above.

It will be understood that the above description of the present invention is susceptible to various modifications, changes, and adaptations, and the same are intended to be comprehended within the meaning and range of equivalents of the appended claims.

I claim:

1. A process for tempering a body of vitreous or vitrocrystalline material containing exchangeable ions, the process comprising the steps of:
    exposing said body to a contacting medium containing ions, which are larger than the exchangeable ions, for diffusing into said body in exchange for certain ions in said body;
    heating internal layers of said body above the strain point thereof while exposing the body to said medium for causing diffusion of ions to take place in external layers of the body without complete stress relaxation in the outer layer of said body, thereby causing compressive stresses in different temperature from that of the internal layers and below the annealing point during diffusion; and
    rapidly cooling said body at a rate sufficient to cause compressive stresses in at least the outer layer of said body in addition to those caused by diffusion, as a result of the more rapid cooling which occurs in said outer layer.

2. A process as defined in claim 1 wherein said medium forms a coating on said body.

3. A process as defined in claim 1 wherein the larger ions are potassium ions.

4. A process as defined in claim 1 wherein said body has substantial transparency to infrared radiation, and wherein said heating step is performed by heating the interior layers of the body with infrared radiation which is absorbed by the body and maintaining the exterior layers of the body below the annealing point by using a gaseous medium during irradiation.

5. A process as defined in claim 4 wherein said body is soda-lime glass, and a substantial proportion of the radiation has a wavelength below about 2.8 microns.

6. A process as defined in claim 5 wherein during the heating step the interior layers of the glass are heated above the annealing point.

7. A process as defined in claim 5 wherein during the heating step the interior layers of the glass are heated above the softening point.

8. A process as defined in claim 1 wherein said body is soda-lime glass.

9. A process according to claim 2 wherein the coating is in film form.

10. In a process for tempering a body of vitreous or vitrocrystalline material containing exchangeable ions, the improvement wherein the process is a process according to claim 1 wherein the tempering comprises thermal tempering subsequent to chemical tempering and said heating is such as to maintain external layers of said body at a temperature below that of the internal layers.

11. A process according to claim 10 wherein said heating is such as to heat internal layers of said body at a temperature above the annealing point.

* * * * *